Nov. 28, 1967 W. A. SOURS ET AL 3,354,734

SPEED CHANGER FOR TAPE RECORDERS

Filed June 28, 1965

INVENTORS:
WILLIAM A. SOURS,
YATES M. HOAG,

BY Norman C. Fulmer
THEIR ATTORNEY.

United States Patent Office 3,354,734

Patented Nov. 28, 1967

3,354,734

SPEED CHANGER FOR TAPE RECORDERS

William A. Sours and Yates M. Hoag, Utica, N.Y., assignors to General Electric Company, a corporation of New York Filed June 28, 1965, Ser. No. 467,573

4 Claims. (Cl. 74—190)

ABSTRACT OF THE DISCLOSURE

A speed changing arrangement for tape recorders comprising a cylindrical sleeve having an inner diameter adapted to fit accurately and concentrically on a drive shaft, the drive shaft and sleeve each including threaded portions arranged to provide a loose threaded fit one with the other to retain the sleeve on the drive shaft while not affecting the alignment thereof.

Figure 1:
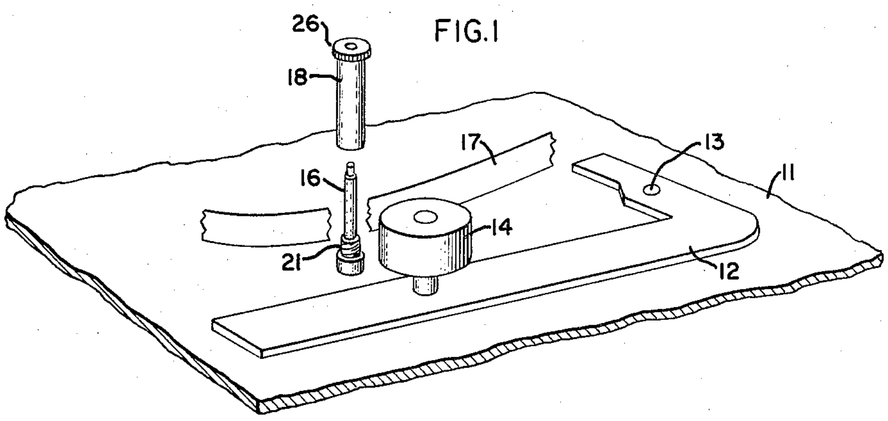

This invention relates to speed changing arrangements for tape recorders and the like, and more particularly relates to such arrangements which function by changing the diameter of a capstan or drive shaft.

Various arrangements have been devised for changing the capstan or drive shaft diameter in order to change the operating speed of tape recorders. One such arrangement employs a stepped shaft having a plurality of different diameters, and this shaft is shifted axially to bring the desired diameter or step thereof into driving relationship with the tape or tape reel drive mechanism. Another arrangement employs a sleeve which can be placed over a capstan shaft, thereby increasing its diameter, and this sleeve is held in place by a screw threaded into the top of the capstan. The first of these prior arrangements involves problems of expensive and space-consuming mechanisms for shifting a stepped capstan or shaft, and the other prior arrangement involves the problem of a screw that can be lost if not captivated to the sleeve, and also this screw can tend to be difficult to use due to its small size and delicate threads which sometimes bind or become dented unless considerable care is taken to start the screw in proper alignment; the latter problems are increased if the pinch wheel or housing or other parts of the tape recorder are located close to the capstan shaft.

An object of the invention is to provide an improved speed-changing arrangement for tape recorders and the like.

Another object is to provide an improved arrangement for adding a sleeve to a capstan or drive shaft when desired to change operating speed of a tape recorder or the like.

Further objects will be apparent from the following description and claims, and from the accompanying drawing.

The speed-changing arrangement of the invention comprises, briefly and in a preferred embodiment, a drive shaft having a diameter suitable for achieving a first speed of operation, and a one-piece cylindrical sleeve having an inner diameter for fitting accurately over the drive shaft and having an outer diameter suitable for achieving a second speed of operation, the drive shaft and sleeve each being provided with a threaded portion for achieving threaded engagement of the sleeve to the shaft. Preferably, these threaded portions are arranged for a loose threaded fit with each other so as not to disturb the accurate concentric fit provided by the inner diameter of the sleeve on the shaft, and also, preferably, the threaded portions are arranged so that the sleeve is threaded onto the shaft in a direction opposite to the operative direction of rotation of the shaft. Still further, these threads are relatively coarse—preferably no greater than 32 threads per inch—so that the sleeve comes into seating engagement on the shaft comparatively abruptly and hence can easily be unscrewed and removed when desired.

Figure 2:
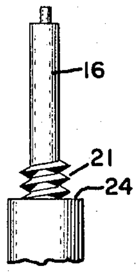
Figure 3:
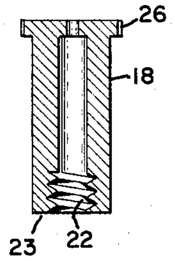
Figure 4:
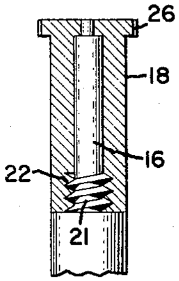

In the drawing,

FIG. 1 is a perspective view of a portion of a tape recorder illustrating the invention, FIG. 2 is a side view of a capstan or drive shaft in accordance with the invention, FIG. 3 is a side view of a speed-changing sleeve in accordance with the invention, and FIG. 4 is a side view of the sleeve of FIG. 3 positioned on the shaft of FIG. 2.

Now referring particularly to FIG. 1, which illustrates the invention as applied to a tape recorder of the capstan drive type, a base member 11 supports the various parts of the tape recorder. An arm 12 is pivoted at point 13 to the base 11, and carries a pinch wheel 14 at a point spaced from the pivot point 13. A capstan drive shaft 16 extends upwardly from the base 11, and is adapted to be rotated by suitable means such as a motor (not shown). In operation of the tape recorder, a magnetic tape 17 is positioned between the capstan shaft 16 and the pinch wheel 14, and the arm 12 is swung so that the pinch wheel 14 engages against the tape 17 so as to "pinch" it against the rotating capstan 16 so the tape will be driven thereby. During this driving operation, the tape 17 is unwound from a supply reel (not shown) and at the same time is wound up on a take-up reel (not shown). It is often desirable to provide two or more speeds of tape movement, for example a relatively fast speed for higher fidelity recording of music and the like, and a relatively slower speed for recordings of sounds that do not involve high fidelity and high frequency response, such as voice, thereby obtaining a longer recording time. A convenient way of changing the tape speed is to provide means for changing the diameter of the capstan 16.

In accordance with the invention, the tape drive speed is changed by means of placing a special sleeve 18 over the capstan shaft 16. The capstan shaft 16 has a diameter such as to drive the tape 17 at the relatively slower speed, and the sleeve 18 has an outside diameter suitable for driving the tape 17 at a relatively faster speed, it being assumed that the speed of rotation of the capstan shaft 16 remains constant for the different speeds of tape operations.

The one-piece sleeve speed changing arrangement of the invention provides a sleeve 18 of which the inner diameter is such as to fit snugly and accurately around and over the capstan shaft 16, so that the sleeve 18 will be in accurate concentricity therewith. Mating threads are provided on the shaft 16 and on the sleeve 18. Preferably the threads 21 of the shaft 16 are provided below the operative capstan portion of the shaft 16, i.e. at the base of the capstan, and have a diameter greater than the capstan diameter, and the threads 22 of the sleeve are provided at the lower end of the inner diameter of the sleeve 18. The threads 21 and 22 are arranged to mate loosely with each other, so as not to disturb the accurate concentric alignment of the sleeve on the shaft 16 as achieved by the close, accurate fitting of the inner diameter of the sleeve 18 on the shaft 16. Thus, the threads 21 and 22 function only to hold the sleeve 18 on the shaft 16, and are not required to provide any sort of alignment of these parts.

The threads 21 and 21 are such that the sleeve 18 screws onto the capstan in a direction that is opposite to the drive rotation direction of the capstan. With reference to FIG. 1, if the tape movement 17 is toward the right, then the capstan 16 rotates counterclockwise, and the threads 21 and 22 are such that when the sleeve 18 is placed over the capstan shaft 16, the sleeve is turned clockwise in order to engage the threads 21 and 22. When the sleeve 18 is in place on the capstan shaft 16, the bottom end 23 of the sleeve abuts against a shoulder 24 at the lower end of the shaft 16, and the sleeve 18 stays threaded in place as long as desired, since the direction of the threads is contrary to the rotational direction of the shaft 16, whence the sleeve 18 is urged to stay in place during operation of the tape mechanism.

Still further, in accordance with the invention, the threads 21 and 22 are somewhat coarse—especially coarser than would ordinarily be expected for threading a sleeve to a capstan. Preferably, these coarse threads 21 and 22 have no more than 32 threads per inch. This coarseness of the threads causes the bottom end 23 of the sleeve 18 to seat rather sharply against the shoulder 24, so that it does not wedge tightly thereagainst, and this permits the sleeve 18 to be unscrewed relatively easily from the capstan 16 when desired. The upper portion of the sleeve 18 may be knurled as indicated at the numeral 26, to facilitate manual turning of the sleeve 18 when attaching it to or removing it from the capstan shaft 16.

It will be readily understood that the invention provides a simple and inexpensive one-piece speed-changing sleeve for use with drive shafts such as capstan drives for tape recorders and the like. This arrangement is not only economical, but is convenient since there is no separate screw to become lost or which necessarily has fine threads that can become easily damaged, or which screw is likely to be difficult to insert with proper alignment into the top end of the capstan 16 in order to fasten the sleeve 18 thereon.

While a preferred embodiment of the invention has been shown and described, various other embodiments thereof will become apparent to those skilled in the art, and will fall within the scope of invention as defined in the following claims.

What we claim is:

1. A speed-changing arrangement for tape recorders and the like, comprising a drive shaft adapted to be rotated in driving engagement with a member to be driven, said drive shaft having a diameter for achieving a first speed of operation, and a one-piece hollow cylindrical sleeve adapted to be selectively placed over said drive shaft, said sleeve having an inner diameter for causing the sleeve to fit accurately and concentrically on said drive shaft and having an outer diameter for achieving a second speed of operation, said drive shaft and sleeve each being provided with a threaded portion for achieving threaded engagement of the sleeve to the shaft, said threaded portions being arranged to provide a relatively loose threaded fit with each other so as not to disturb the accurate concentric fit of said sleeve on said shaft.

2. An arrangement as claimed in claim 1, in which said threaded portions are arranged so that the sleeve threads onto the shaft in a direction opposite to the direction of said rotation of the shaft.

3. An arrangement as claimed in claim 1, including means for seating said sleeve on said shaft when screwed theron, said threads being relatively coarse and no greater than 32 threads per inch, so that the sleeve comes into seating engagement on the shaft relatively abruptly to permit easy unscrewing and removal thereof.

4. An arrangement as claimed in claim 1, in which said threaded portion of the drive shaft is at the base thereof, and said threaded portion of the sleeve is at an end thereof.

References Cited

UNITED STATES PATENTS

| | | | |
|---|---|---|---|
| 2,865,632 | 12/1958 | Vogel et al. | 74—190 X |
| 3,099,376 | 7/1963 | Kennedy | 271—190 X |

DONLEY J. STOCKING, *Primary Examiner.*

DAVID J. WILLIAMOWSKY, *Examiner.*

L. H. GERIN, *Assistant Examiner.*